United States Patent [19]

Allington

[11] 3,714,591

[45] Jan. 30, 1973

[54] BASELINE CORRECTION CIRCUIT

[75] Inventor: Robert W. Allington, Lincoln, Nebr.

[73] Assignee: Instrumentation Specialties Company, Lincoln, Nebr.

[22] Filed: Feb. 17, 1972

[21] Appl. No.: 227,180

[52] U.S. Cl. ....................328/162, 307/264, 328/167

[51] Int. Cl. ............................H03k 5/08, H03k 1/10

[58] Field of Search..............328/127, 151, 162, 167; 307/264; 235/151.35, 183; 340/347 CC

[56] References Cited

UNITED STATES PATENTS

| | | | |
|---|---|---|---|
| 3,628,003 | 12/1971 | Spence | 328/162 X |
| 3,667,056 | 5/1972 | Allington et al. | 328/151 |

*Primary Examiner*—John Zazworsky
*Attorney*—Vincent L. Carney

[57] ABSTRACT

When the baseline potential appears on the input terminal of the baseline correction circuit without the signal, the baseline potential is conducted to the sample, hold, and subtract circuit from the input terminal through a low pass filter which provides a slow propagation rate to and removes some ripple from the baseline potential, after which the sample, hold and subtract circuit samples and stores values of the baseline potential. When the signal is detected on the input terminal by a signal detector, the low pass filter is disconnected so that the signal is received at a higher rate of propagation without being distorted by the low pass filter, with the sample, hold and subtract circuit subtracting the stored baseline potential from the signal. The change in the propagation rate is sufficient to compensate for any delay in the signal detector so that the last stored value of baseline potential is not increased by the beginning of the signal.

19 Claims, 3 Drawing Figures

BASELINE CORRECTION CIRCUIT

This invention relates to baseline potential correction circuits and to methods for correcting signals for drifting baselines.

Baseline correction circuits generally include apparatus for storing a baseline potential, apparatus for subtracting the baseline potential from the signal and a control circuit for controlling the storing and subtracting operations. In one type of baseline correction circuit intended for use with testing equipment such as chromatographs in which the frequency of the signal is not known beforehand, the control circuit includes: (1) a signal detector that determines when the output of the test equipment is a signal and when it is a baseline potential without a signal, and (2) a logic circuit that causes a hold and subtract circuit to receive and store the baseline potential when only the baseline potential is present on the output terminal of the test equipment and to subtract the stored value of the baseline potential from the signal when the signal occurs.

Generally, in the prior art baseline correction circuits, the signal that is stored is the baseline potential which occurs at the input terminal of the hold and subtract circuit when the signal is detected.

The prior art baseline correction circuits have a disadvantage in that the precision of the correction of signals is excessively low because the amplitude of the stored potential is increased over the amplitude of the baseline potential before being subtracted from the combined signal and baseline. This happens for two reasons, which are: (1) a slight delay in the control circuitry causes an amplitude of potential to be stored that includes both the baseline potential and a beginning portion of the signal and; (2) under some circumstances, the instantaneous amplitude of baseline potential is stored and this amplitude includes the peak of a noise ripple at the time of storage. The delay in the control circuitry is primarily the period of time from the start of the signal until it reaches an amplitude that the control circuitry is capable of sensing.

Accordingly, it is an object of the invention to provide a novel apparatus and method for correcting a signal.

It is a further object of the invention to provide a novel method of circuit for controlling the value of baseline potential that is stored in a baseline correction circuit.

It is a still further object of the invention to provide an apparatus and method for removing noise from and averaging a baseline potential that is to be stored.

It is a still further object of the invention to provide a novel apparatus and method for enabling the baseline potential to be stored before the occurrence of a signal with the baseline potential, which signal occurs at a time not known precisely beforehand.

In accordance with the above and further objects of the invention, a baseline correction circuit includes a control circuit and a hold and subtract circuit adapted to receive signals, the time of occurrence of which are not precisely predictable beforehand, through a propagation path that is connected between the hold and subtract circuit and a signal generating unit such as a chromatograph or other test equipment.

Before the signal occurs, the circuit maintains a relatively slow rate of propagation of the baseline potential from the test equipment along the propagation path to the hold and subtract circuit while causing the hold and subtract circuit to receive and store the baseline potential, and after the signal occurs with the baseline potential, increases the rate of propagation along the propagation path while causing the hold and subtract circuit to subtract the stored baseline potential from the signal. The control circuit also causes the baseline potential to be averaged to remove ripple while it is being stored.

The propagation path includes a low pass filter that is connected into the circuit when a signal detector within the control circuit detects that only the baseline potential is present and is disconnected from the circuit when the signal detector detects the beginning of a signal.

The low pass filter removes the ripple from and reduces the rate of propagation of the baseline potential. Because it reduces the rate of propagation of the baseline potential, the low pass filter acts as a time delay to compensate for any other delays in the circuit such as a delay in the signal detector that otherwise would, under some circumstances, cause the amplitude of the signal that is stored to include the beginning amplitude of the signal as well as the baseline potential. In one embodiment, the control circuit also causes a sample, hold and subtract circuit to periodically sample the baseline potential until the beginning of the signal is detected, at which time the sampling is stopped so that the last sample occurs before the start of the signal.

Because the baseline correction circuit of this invention provides a low rate of propagation to the baseline potential, it has two advantages that improve the precision of the correction, which are: (1) the baseline potential is averaged to remove ripple and noise; and (2) substantial tolerance is provided to insure that the baseline potential is received and stored before the signal causes it to rise to a higher amplitude.

Because the low pass filter is disconnected when the signal occurs, the baseline correction circuit has two further advantages which improve the quality of the corrected signal, which are: (1) a signal that is not distorted by having its top flattened or its sides unevenly stretched; and (2) the trailing edge is not stretched to such an extent that the signal detector stops the subtraction operation before the trailing edge has completely passed through the sample, hold and subtract circuit.

The above-noted and other features of the invention will be better understood from the following detailed description when considered with reference to the accompanying drawings, in which.

Figure 1:
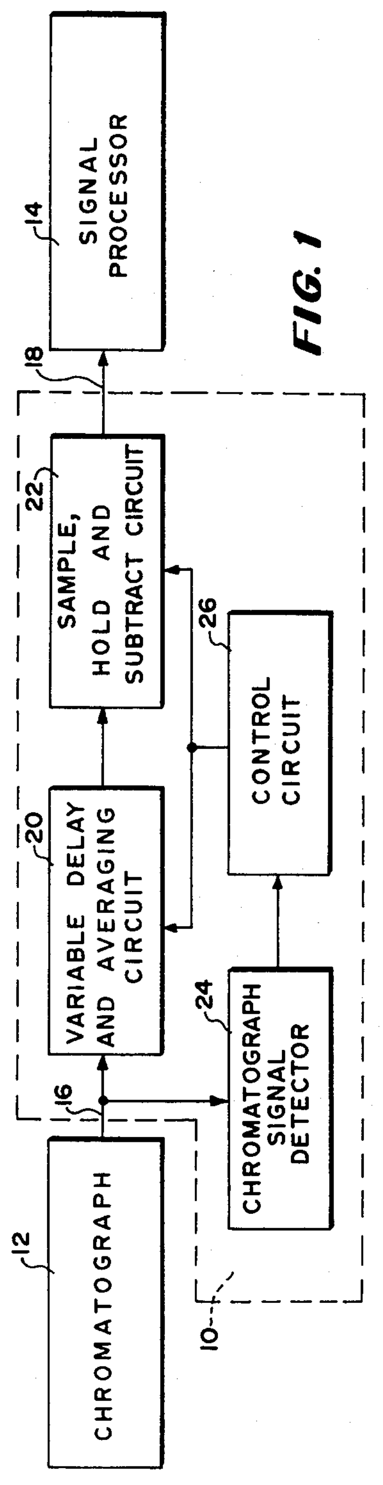
FIG. 1 is a block diagram of a baseline correction circuit, which includes an embodiment of the invention.

In FIG. 1, there is shown a baseline correction circuit 10, a chromatograph 12, and a signal processor 14.

The chromatograph 12 includes apparatus for testing a gas or a liquid and generating a plurality of chromatographic signals that occur periodically on an output conductor 16 as peaks interrupting a baseline potential, with the frequency, amplitude and shape of the chromatographic signals indicating the nature of the gas or liquid being tested. The chromatograph applies the baseline potential and chromatographic signals to the baseline correction circuit 10 through the conductor 16.

The baseline correction circuit 10 removes the baseline potential from the chromatographic signals applied to it on the conductor 16 and conducts only the chromatographic signals through a conductor 18 to the signal processor 14, which operates on the signals in a manner known in the art and provides indications and recordings containing information about the material being tested in the chromatograph 12.

The baseline correction circuit 10 includes a variable delay and averaging circuit 20, a sample, hold and subtract circuit 22, a chromatograph signal detector 24, and a control circuit 26. The variable delay and averaging circuit 20 and the sample, hold and subtract circuit 22 are electrically connected in series between the chromatograph 12 and the signal processor 14 to process the time-varying electrical signals from the chromatograph 12 before they are applied to the signal processor 14.

The variable delay and averaging circuit 20 includes circuitry that:(1) delays the baseline potential from the chromatograph 12 before the chromatographic signals appear, or in other words, provides a low propagation rate to the baseline potential when there is only a baseline potential on the conductor 16; and (2) terminates its delaying action, or in other words, provides a high propagation rate to the chromatographic signals when they appear on the conductor 16. Because of this change in the propagation rates, the leading edge of the chromatographic signal is delayed slightly before being applied to the sample, hold and subtract circuit 22, which delay enables the chromatograph signal detector 24 to detect the signal and enables the control circuit 26 to operate upon the sample, hold and subtract circuit before the leading edge of the chromatographic signal reaches the sample, hold and subtract circuit.

The sample, hold and subtract circuit 22 includes circuitry that samples and stores the baseline potential before the chromatographic signal is applied to it. When it receives the chromatographic signal from the variable delay and averaging circuit 20, it subtracts the baseline potential that it has stored from the chromatographic signal to provide a corrected signal to the signal processor 14 through the conductor 18.

To control the variable delay and averaging circuit 20 and the sample, hold and subtract circuit 22 in response to changes in the time-varying potentials from the chromatograph 12, the input of the chromatograph signal detector 24 is electrically connected to the chromatograph 12 and its output is electrically connected to the input of the control circuit 26, one output of which is electrically connected to the variable delay and averaging circuit 20 and the other output of which is electrically connected to the sample, hold and subtract circuit 22.

The chromatographic signal detector 24 includes circuitry that provides a first output signal to the control circuit 26 when there is no chromatographic signal on the output conductor 16 of the chromatograph 12 and provides a second signal to the control circuit 26 when a chromatographic signal appears with the baseline potential on the output conductor 16.

Chromatograph signal detectors having satisfactory characteristics for use in the baseline correction circuit 10 are known in the prior art and are sometimes referred to as peak detectors or as slope detectors. One type of satisfactory slope detector is disclosed in the copending U.S. patent application Ser. No. 90,252 to Robert W. Allington, assigned to the same assignee as this application, and another is disclosed in U.S. Pat. No. 3,202,188. Either of the slope detectors are suitable for use with the control circuit 26, but must be adapted in a manner known to persons skilled in the art for use with the particular control circuit. If the slope detector described in U.S. Pat. application Ser. No. 90,252 is used as the chromatograph signal detector 24, the logic circuit disclosed in the copending U.S. Patent application Ser. No. 90,247 to Robert W. Allington et al. may also be used to improve the performance of the slope detector in applying the first and second signals to the control circuit 26.

The control circuit 26 includes apparatus for controlling switches within the variable delay and averaging circuit 20 and within the sample, hold and subtract circuit 22 in response to the first and second signals from the chromatograph signal detector 24 indicating the presence of a chromatographic signal or the absence of such a signal. The switches are controlled so as to select the times that: (1) the variable delay and averaging circuit 20 provides a low rate of propagation; (2) the variable delay and averaging circuit 20 provides a high rate of propagation; (3) the sample, hold and subtract circuit 22 stores the baseline potential; and (4) the sample, hold and subtract circuit 22 subtracts the stored baseline potential from the chromatographic signal.

The signal processor 14 may be any one of several suitable types of signal processors known in the prior art for providing information to an operator that enable him to determine the nature of the gas or liquid in the chromatograph 12. Typical operations performed upon the chromatographic signal by the signal processor 14 are the integration of the signal and the printing of a number proportional to the integral or the measuring of the peak amplitudes and the times of the peak amplitudes from a reference time and the printing of numbers indicating these amplitudes and times.

In operation, the chromatograph 12 produces a series of periodically occurring chromatographic signals on the output conductor 16, with only a baseline potential being present between signals.

When only a baseline potential is present without a chromatographic signal, the chromatograph signal detector 24 receives the baseline potential and provides a first signal to the control circuit 26. The control circuit 26, upon receiving the first signal: (1) causes the variable delay and averaging circuit 20 to apply the baseline potential to the sample, hold and subtract circuit 22 at a low rate of propagation and to average the baseline potential to remove ripple; and (2) causes the sample, hold and subtract circuit to periodically sample the average amplitude of baseline potential applied to it through the variable delay and averaging circuit 20 and to store the last value of baseline potential that it receives.

When a chromatographic signal occurs with the baseline potential on the conductor 16, the chromatograph signal detector 24 receives the signal and provides a second signal to the control circuit 26. The control circuit 26, upon receiving the second signal: (1) causes the variable delay and averaging circuit 20 to apply the chromatographic signal and baseline potential to the sample, hold and subtract circuit 22 at a high rate of propagation so that the signal is not distorted; and (2) causes the sample, hold and subtract circuit 22 to stop sampling and start subtracting the last stored amplitude of baseline potential from the chromatographic signal and baseline potential to remove the baseline potential from the chromatographic signal.

Figures 2, 3:
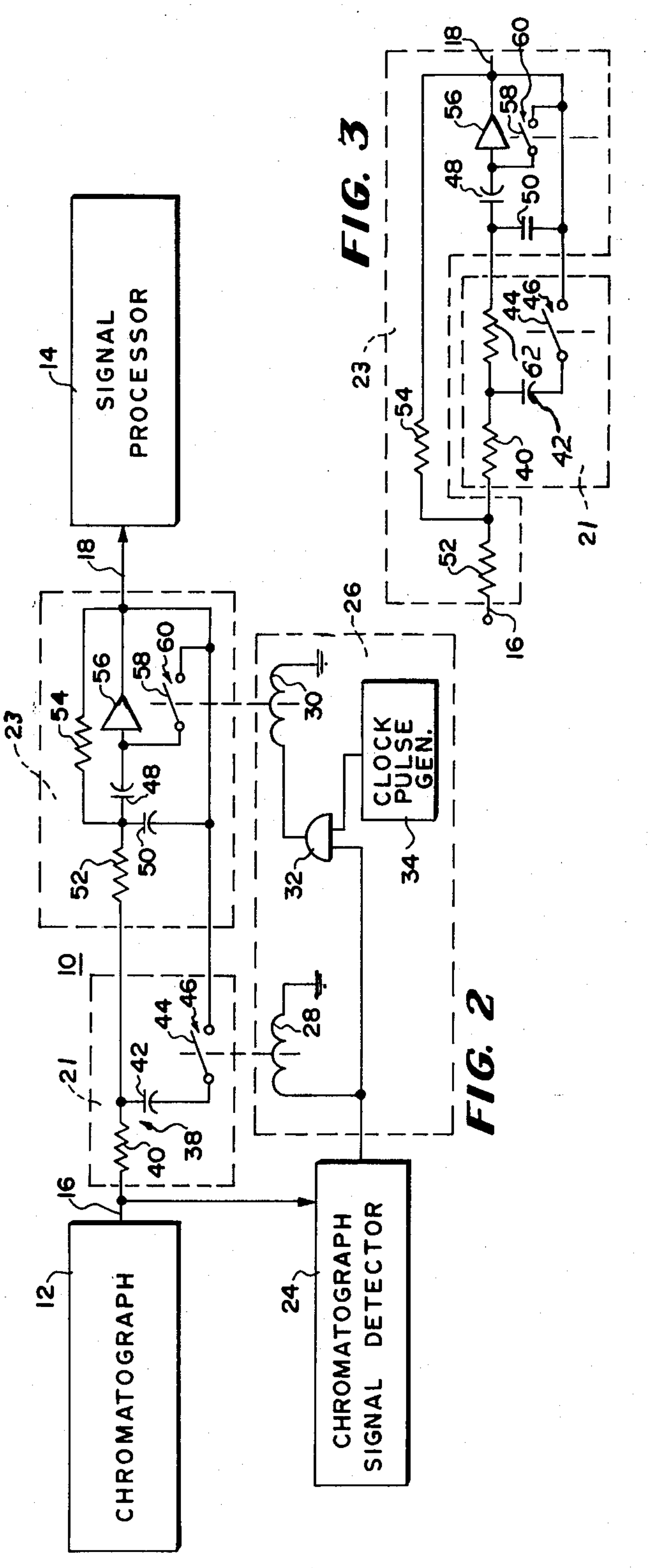
FIG. 2 is a diagram, partly schematic circuit and partly functional block, of the baseline correction circuit of FIG. 1.
FIG. 3 is a fragmentary schematic circuit diagram of another embodiment of the baseline correction circuit.

In FIG. 2, there is shown a diagram of the baseline correction circuit 10 in which specific circuits for performing the functions of the variable delay and averaging circuit 20, the sample, hold and subtract circuit 22, and the control circuit 26, described in connection with FIG. 1. are shown in schematic circuit diagrams. In this embodiment, the functions of the variable delay and averaging circuit are performed partly by a separate variable delay and averaging circuit 21 and partly by a combined-function circuit 23 and the functions of the sample, hold and subtract circuit are performed by the combined-function circuit 23.

As shown in FIG. 2, the control circuit 26 includes a first solenoid winding 28, a second solenoid winding 30, a gate 32, and a source of clock pulses 34.

To control the separate variable delay and averaging circuit 21, one end of the first solenoid winding 28 is electrically connected to the output of the chromatograph signal detector 24 to receive a positive electrical potential when the chromatograph signal detector 24 does not detect a chromatographic signal from the output of the chromatograph 12 and to receive a ground level potential from the chromatograph signal detector 24 when the chromatograph signal detector 24 does detect a chromatographic signal. The other end of the first solenoid winding 28 is grounded so that the solenoid winding 28 is energized when there is no chromatographic signal on the output conductor 16 of the chromatograph 12 and is deenergized whenever a chromatographic signal does appear on the output conductor 16 of the chromatograph 12.

To control the combined-function circuit 23, one end of the second solenoid winding 30 is connected to the output of the two input gate 32 and the other end is grounded, with one input of the two input gate 32 being electrically connected to the output of the chromatograph signal detector 24 and the other input being electrically connected to the output of the clock pulse generator 34. When there is no chromatographic signal on the conductor 16, the clock pulses from the generator 34 and the positive potential from the chromatograph signal detector 24 periodically coincide, causing the solenoid coil 30 to be periodically energized in synchronism with the clock pulses from the generator 34. The solenoid coil 30 is deenergized between the clock pulses and when a chromatographic signal is detected by the chromatograph signal detector 24.

To delay and average the baseline potential, the separate variable delay and averaging circuit 21 includes a low pass filter 38 comprising a resistor 40 and a capacitor 42. A single movable contact arm 44 cooperates with the solenoid coil 28 of the control circuit 26 to form a single-pole, a single-throw relay switch 46. One end of the resistor is electrically connected to the conductor 16 to receive the chromatographic signals and baseline potential from the chromatograph 12 and the other end is connected to the input of the combined-function circuit 23 and to a first plate of the capacitor 42, the second plate of the capacitor 42 being connected to the movable contact arm of the relay switch 46.

The fixed contact of the switch 46 is grounded so that when a baseline potential appears on the output 16 of the chromatograph 12 without a chromatographic signal to close the switch 46, the baseline potential is averaged and delayed by the RC low pass filter 38. However, when a chromatographic signal appears on the conductor 16, the chromatograph signal detector 24 deenergizes the solenoid coil 28, opening the switch 46 to disconnect the capacitor 42 and thereby stop the averaging and delaying action of the low pass filter 38. This enables the chromatographic signal to be conducted to the combined-function 23 without distortion from the low pass filter 38 and with a faster response time.

To delay, sample and store the baseline potential and to subtract the baseline potential from the chromatographic signal, the combined-function circuit 23 includes a first capacitor 48, a second capacitor 50, a first resistor 52, a second resistor 54, an operational amplifier 56, and the switch arm 58 of a relay-operated, single-pole, single-throw switch 60, which relay switch includes the solenoid coil 30 of the control circuit 26.

To receive the baseline potential and the chromatographic signal, one end of the first resistor 52 is electrically connected to the output of the variable delay and averaging circuit 20, with one plate of the second capacitor 50 being electrically connected to the stationary contact of the relay switch 60 and the other plate being electrically connected to the other end of the first resistor 52, a first end of the second resistor 54 and a first plate of the first capacitor 48.

To apply signals to the operational amplifier 56, the second plate of the first capacitor 48 is electrically connected to the movable contact 58 of the switch 60 and to the input of the operational amplifier 56, with the output of the operational amplifier 56 being electrically connected to the other end of the resistor 54 and to the input of the signal processor 14 through the conductor 18.

The switch 16 is in its open position when the solenoid coil 30 is deenergized either because no clock pulse is applied to one input of the gate 32 or because a low potential is being emitted by the chromatograph signal detector 24 to indicate that a chromatographic signal is present on the output of the chromatograph 12. With the switch 58 in this position, signals are applied through the operational amplifier 56 to the signal processor 14 with the potential on the capacitor 48 being subtracted from the input signal to the operational amplifier. When the solenoid coil 30 is energized by a clock pulse from the clock pulse generator 34 and the positive potential from the chromatograph signal detector 24 indicating a baseline potential without a chromatographic signal, the switch 60 is closed causing the input and the output of the operational amplifier 56 to be connected together and held at zero potential so that the baseline potential is: (1) delayed and filtered to remove ripple by the low pass filter; and (2) applied to the capacitor 48, which stores it at a fraction of the amplitude of the input signal to resistor 52, the latter occurring because both the input and the output of the operational amplifier are held at zero potential, causing the full amplitude of the baseline potential to fall across the resistors 52 and 54, with the same portion of the amplitude being applied across both resistor 54 and the capacitor 48. In the preferred embodiment, the resistors 52 and 54 have equal resistances so that a potential equal to one-half of the amplitude of the potential at the input to resistor 52 is stored on the capacitor 48.

With the arrangement shown in FIG. 2, the switch 60 is closed at each clock pulse before a chromatographic signal is detected by the chromatograph signal detector 24, causing: (1) the baseline potential to be sampled and one half of its amplitude to be stored across the capacitor 48; and (2) the propagation rate of the potential applied to the combined-function circuit 23 to be reduced by the RC circuit that includes resistor 52 and parallel capacitors 48 and 50. When a chromatographic signal appears at the output conductor 16, the chromatograph signal detector 24 inhibits the closing of the switch 60 so that: (1) the potential stored immediately before the clock pulse is retained on the capacitor 48 for later subtraction from the incoming chromatographic signal; and (2) the incoming chromatographic signal is not greatly distorted nor delayed by the RC circuit at the input to the combined-function circuit 23 because only the relatively small capacitor 50 continues to connect one end of the resistor 52 to ground.

While the switch 60 in the preferred embodiment is controlled by pulses applied to the gate 32 from the clock pulse generator 34, the invention may be practiced without such a gate or clock pulse generator. In such an embodiment, the output from the chromatograph signal detector 24 is directly connected to one end of the solenoid coil 30, the other end being grounded. In this embodiment, the switch 60 is closed when a chromatographic signal is not detected by the chromatograph detector 24 and continuously open when the chromatographic signal is detected by the chromatograph detector 24. In both embodiments, the separate variable delay and averaging circuit 21 generally enables the baseline potential to be stored just before the chromatographic signal appears at the input to the combined-function circuit 23 and the combined-function circuit 23 includes another time-delay to insure that no substantial portion of the signal will be stored in addition to the baseline potential, with both time-delay circuits being effectively disconnected when the signal is applied to the propagation path.

In FIG. 3, there is shown another embodiment of the invention in a fragmentary schematic circuit diagram illustrating only the separate variable delay and averaging circuit 21 and the combined-function circuit 23. In this diagram parts that are identical to parts in the embodiment of FIG. 2 are indicated by the same reference numbers that are used for the identical parts in FIG. 2.

The embodiment of FIG. 3 operates basically in the same manner as the embodiment of FIG. 2 but the separate variable delay and averaging circuit 21 is electrically connected between the resistor 52 and the capacitor 50 so that it may be adjusted to change its characteristics without changing the values of the resistors 52 and 54 that cooperate with the operational amplifier 56.

The separate variable delay and averaging circuit 21 also includes a resistor 62 having one end electrically connected to one end of the resistor 40 and one plate of the capacitor 42 and having its other end electrically connected to one plate of each of the capacitors 50 and 48. This resistor cooperates with the capacitor 50 to provide low pass filtering in the embodiment of FIG. 3.

In a typical embodiment of the invention, intended to process chromatographic signals having a duration of between 1 and 10 seconds: (1) the resistors 52 and 54 are 19.1 K resistors; (2) the capacitor 50 is 0.05 microfarads; (3) the capacitors 42 and 48 are 5 microfarads; (4) the resistor 40 is 66 K;and (5) the resistor 62 is 36 K. For signals of longer durations the resistances of the resistors 40 and 62 are increased in direct proportion to the duration of the peaks and the other circuit parameters remain the same. For example, for signals having durations of between 20 and 200 seconds, resistor 40 has a value of resistance of 1.32 M and resistor 62 has a value of resistance of 720 K.

In an embodiment in which the switch arm 58 is periodically closed in response to the clock pulses from the clock pulse generator 34, the resistor 62 is smaller in direct proportion to the narrowness of the clock pulses. For example, if the width of the clock pulses are such that the switch arm 58 is closed during each clock pulse on an average, one-fifth of the time duration of a signal for signals that are in the range of between 1 to 10 seconds in duration, the resistor 62 is 7.2 K rather than 36 K.

In the operation of the circuit of FIG. 2, the baseline potential generated by the chromatograph 12 between chromatographic signals is delayed, filtered and stored and the chromatographic signal is conducted to the signal processor 14 in relatively undistorted form after the baseline potential has been subtracted from it.

Before a chromatographic signal occurs on the output conductor 16 of the chromatograph 12, the chromatograph signal detector applies a positive potential to the solenoid winding 28 and to one input of the gate 32 to energize the solenoid 28, thereby closing the switch 46. Periodically, the clock pulse generator 34 applies positive clock pulses to the other input of the gate 32, opening the gate 32 to energize the solenoid winding 30, thereby closing the switch 60 in synchronism with the clock pulses from the clock pulse generator 34.

With the switch 46 closed, the baseline potential is delayed and filtered by the low pass filter 38 in the separate variable delay and averaging circuit 21 and conducted to the combined-function circuit 23. The baseline potential is filtered and delayed further in the low pass filter that includes the resistor 52 and the capacitor 48 in the embodiment of FIG. 2 while the switch 60 is closed. Of course, in the embodiment of FIG. 3, the resistor 62 and the capacitor 48 perform this function instead, since the resistor 52 is connected to the conductor 16.

Each time the switch 60 is closed, the output of the operational amplifier 56 is connected to its input through the movable contact 58 and the fixed contact of the switch 60 causing the potential on the conductor 18 to be substantially zero. Since the potential on conductor 18 is substantially zero, the entire baseline potential is across the equal-valued resistors 52 and 54, with the half of the baseline potential that is across the resistor 54 also falling across the capacitor 48. When the switch 60 is opened at the termination of each clock pulse, the input of the operational amplifier 56 remains near zero potential and the output varies with the input potential to the resistor 52 of the sample, hold and subtract circuit 22.

In this manner, each time the switch 60 is closed by the simultaneous application of a clock pulse from the clock pulse generator 34 and a positive potential from the chromatograph signal detector 24, the combined-function circuit 23: (1) delays the baseline potential; and (2) stores the baseline potential at one-half of its amplitude.

When the chromatograph 12 applies a chromatographic signal to the conductor 16, the chromatograph signal detector 24 senses the chromatographic signal and applies a ground level potential to the solenoid winding 28 and to one input of the gate 32, causing switches 46 and 60 to open.

With the switch 46 open, the capacitor 42 is disconnected from the circuit so that the chromatographic signal is not delayed nor filtered but is instead passed directly to the combined-function circuit 23. Since the low pass filters of the separate variable delay and averaging circuit 21 and the combined-function circuit are disconnected, the chromatographic signal is not distorted in the manner that it would be under some circumstances if it passed through the low pass filters. For example, the low pass filters flatten the tops of some chromatographic signals. Moreover, low pass filters delay both the leading edges and the trailing edges of chromatographic signals and thereby change the value of the integrals of some chromatographic signals, which is an undesirable result.

Because the baseline potential and chromatographic signal are delayed by the separate variable delay and averaging circuit 21 until the switch 46 is opened, the chromatographic signal does not reach the combined-function circuit 23 until the switch 60 is opened, even though there is some delay in the operation of the chromatographic signal detector 24. Moreover, since the switch 60 is open between clock pulses, it is opened as much as one clock pulse time before the chromatograph signal detector 24 applies a ground level signal to the gate 32 to indicate that the chromatographic signal has occurred at the output of the chromatograph 12. For both of these reasons, the amplitude of the baseline potential that is stored in the capacitor 48 when the chromatograph signal detector terminates the sampling and delaying operations of the combined-function circuit 23 and causes it to start subtracting is one half of the amplitude of the baseline potential just before the occurrence of the chromatographic signal and is not increased above this amplitude by the occurrence of the chromatographic signal.

When the chromatographic signal reaches the combined-function circuit 23, one-half of its amplitude is reduced by the potential stored on the capacitor 48 and the difference between the amplitudes is applied to the signal processor 14 through the conductor 18, with one-half of the amplitude of the chromatographic signal being dropped across the resistor 52.

Because the baseline correction circuit 10 of this invention decreases the rate of propagation of the baseline potential when there is no chromatographic signal, it has three advantages. Firstly, in the embodiment in which a sampling gate 32 and clock pulse generator 34 are utilized to operate the switch 60, there is no danger of an inaccuracy occurring when the clock pulse happens to coincide or nearly coincide with the beginning of a chromatographic signal since the chromatographic signal is delayed until after the last sample is stored. Because of this delay, one-half of the amplitude of the baseline potential is precisely stored without inaccuracies resulting from an increase in the baseline potential caused by the beginning of the chromatographic signal. Secondly, the low pass filter or filters removes ripple from the baseline potential so that a more precise amplitude of baseline potential is stored on the capacitor 48. Thirdly, even in an embodiment in which the sampling is continuous rather than intermittent such as being under the control of a gate and clock pulse generator, the delay in the leading edge of the chromatographic signal insures that the storage of the baseline potential is complete before the chromatographic signal reaches the sample, hold and subtract circuit 22 by compensating for any delay in the chromatograph signal detector 24.

Because the baseline correction circuit 10 increases the rate of propagation of the chromatographic signal when the chromatographic signal occurs on the output conductor 16 of the chromatograph 12, it has several advantages, such as for example: (1) by removing the low pass filter or low pass filters from the circuit, the peak of the chromatographic signal is passed in a relatively undistorted form rather than being flattened as would be the case with a high frequency peak if the low pass filters remained in the circuit; (2) the chromatographic signal detector is prevented from indicating the absence of a chromatographic signal before the trailing edge of the signal enters the hold and subtract circuit to be corrected and transmitted to the signal processor 14 because the trailing edge is not unduly delayed; and (3) there is no lack of precision caused by a delayed trailing edge not compensating sufficiently for a delayed leading edge which could be the situation were a low pass filter to remain in the circuit after the chromatographic signal occurs at the output conductor 16 of the chromatograph 12.

Although preferred embodiment of the invention has been described with some particularity, it is to be understood, that many modifications and variations of the invention are possible within the light of the above teachings. Therefore, it is to be understood, that within the scope of the appended claims, the invention may be practiced otherwise than as specifically described.

What is claimed is:

1. Baseline correction apparatus for subtracting a baseline potential from an input signal occurring with the baseline potential at times not predicted beforehand, comprising:

a propagation path;

hold and subtract means for receiving a baseline potential applied to it from the propagation path, storing a function of the received baseline potential, and subtracting the stored function from a function of the input signal; and control means for causing said propagation path to have a low rate of propagation when said baseline potential is applied to it and a high rate of propagation when said input signal is applied to it.

2. Baseline correction apparatus according to claim 1 in which said control means includes switch means for causing said hold and subtract means to receive said baseline potential and store a function of said baseline potential during one period of time and subtract the function of the baseline potential from the function of the signal during another period of time.

3. Baseline correction apparatus according to claim 1 in which said control means includes a means for averaging the value of said baseline potential whereby ripple is reduced.

4. Baseline correction apparatus according to claim 1 in which said control means includes:

a low pass filter;

means for connecting said low pass filter into said propagation path when said baseline potential is applied to said propagation path without said signal and means for disconnecting said low pass filter from said propagation path when said signal is applied to said propagation path.

5. Baseline correction apparatus according to claim 4 in which said low pass filter includes:

a resistor having a first end and a second end;

said first end of said resistor being adapted to receive said baseline potential and said signal;

a capacitor having first and second plates;

said first plate of said capacitor being electrically connected to said second end of said resistor;

a switch having first and second contacts;

one of said first and second contacts of said switch being grounded and the other being connected to said second plate of said capacitor; and means for closing said switch when said baseline potential is applied to said propagation path and opening said switch when said signal is applied to said propagation path.

6. Baseline correction apparatus according to claim 4 including a storage means comprising a common part of said hold and subtract means and said control means, said control means further comprising:

sampling means for periodically sampling said baseline potential and applying said baseline potential to said storage means; and means for inhibiting said sampling means when said signal is applied to said propagation path, whereby said storage means stores the function of said baseline potential immediately before said signal is applied to said propagation path.

7. Baseline correction apparatus according to claim 4 adapted to provide corrected signals to a signal processor, said baseline correction apparatus including a capacitor forming a common part of said control means and said hold and subtract means, said control means further comprising:

switch means for causing at least a portion of said baseline potential to be applied to said capacitor when said baseline potential is applied to said propagation path without said signal;

said capacitor having a first plate and a second plate;

an operational amplifier having an input and an output;

said input of said operational amplifier being electrically connected to said first plate of said capacitor and to said switch means;

a first resistor having a first end and a second end;

a second resistor having a first end and a second end;

said second plate of said capacitor being electrically connected to the output of said operational amplifier and to said switch means;

said second end of said first resistor being electrically connected to said propagation path;

said second end of said second resistor being electrically connected to the output of said operational amplifier and to said switch means; and said operational amplifier being adapted to provide said corrected signals to said signal processor.

8. Baseline correction apparatus according to claim 7 in which said switch means includes a switch having one contact electrically connected to the input and the other contact electrically connected to the output of said operational amplifier, whereby said input and output are electrically connected when said switch means samples said baseline potential and are opened when said hold and subtract means subtracts said baseline potential.

9. Baseline correction apparatus according to claim 8 in which said switch means further comprises gating means for closing said switch periodically when said baseline potential is applied to said propagation path and inhibiting the closing of said switch when said input signal is applied to said propagation path.

10. Baseline correction apparatus according to claim 8 in which said low pass filter includes:

a resistor having a first end and a second end;

said first end of said resistor being adapted to receive the baseline potential and said signal;

a capacitor having a first plate and a second plate;

said first plate being electrically connected to said second end of said resistor and to said hold and subtract means;

a second switch having a first contact and a second contact;

one of said first and second contacts of said second switch being a movable contact; and one of said first and second contacts of said second switch being electrically connected to said second plate and the other being grounded;

said control means including means for making said first and second contacts of said second switch when only a baseline potential is applied to the input of said propagation path and for breaking said contacts when an input signal is applied to the input of said propagation path.

11. A method of correcting for a drifting baseline potential of signals which occur at times that are not predicted beforehand, comprising the steps of:

applying said baseline potential to a storage means at a first propagation rate; and applying said signals at a second propagation rate to a subtractor with said stored baseline potential, whereby said baseline potential is subtracted from said stored baseline potential.

12. The method of claim 11 in which the step of applying said baseline potential to a storage means at a first propagation rate comprises the step of applying said baseline potential to a propagation path having a first rate of propagation and applying the output from said propagation path to a capacitor.

13. A method according to claim 12 in which the step of applying the signals at a second propagation rate to a subtractor with said stored baseline potential comprises the step of applying said signals to said subtractor at a faster rate of propagation than that at which said baseline potential was applied to said storage means.

14. A method according to claim 13 in which said step of applying the signals to said subtractor at a faster rate of propagation comprises the steps of:

applying the signals to the input of the same propagation path through which said baseline potential was conducted; and altering the propagation rate at substantially the same time that the signals are applied to it so that it has a faster rate of propagation.

15. The method of claim 14 in which the step of applying the baseline potential to a storage means at a first propagation rate comprises the step of applying the baseline potential to a propagation path and, while the baseline potential is in the propagation path, connecting a low pass filter to the propagation path, whereby the path of propagation of the propagation path is decreased and the baseline potential is averaged.

16. A method according to claim 15 in which the step of applying the baseline potential to a storage means comprises the steps of:

sampling the potential of the propagation path;

applying the sampled potential to a storage capacitor;

detecting the presence of an incoming signal to the propagation path; and inhibiting the sampling of the propagation path upon the detecting of the incoming signal whereby the baseline potential occurring just before a signal is detected is stored in the storage means.

17. A method according to claim 16 in which the low pass filter is disconnected from the propagation path at the same time that the sampling is inhibited.

18. A method according to claim 17 in which:

the step of applying said baseline potential to a storage means comprises the step of applying the baseline potential to a capacitor that is connected between the input of an operational amplifier and the junction between two resistors, one of which is connected to the output of the operational amplifier at its other end;

the step of applying said signals at a second propagation rate to a subtractor comprises the steps of applying the signals from the propagation path to the other end of the other resistor, whereby the signal has a polarity that is opposed by said stored baseline potential; and said method further comprising the step of taking the signal minus the stored baseline potential times the function determined by the ratio of the resistances of the two resistors from the output of the operational amplifier and applying it to a signal processor.

19. A method according to claim 15 in which the step of applying the baseline potential to a storage means comprises the step of periodically sampling the potential of the propagation path.

* * * * *